(12) United States Patent
Childers et al.

(10) Patent No.: US 8,086,617 B2
(45) Date of Patent: Dec. 27, 2011

(54) LINK ANALYSIS MAPPING PROGRAM RISK MANAGEMENT

(75) Inventors: J. Gilmore Childers, Summit, NJ (US); David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 0 days.

(21) Appl. No.: 12/785,387

(22) Filed: May 21, 2010

(65) Prior Publication Data

US 2010/0235397 A1    Sep. 16, 2010

Related U.S. Application Data

(63) Continuation of application No. 10/801,438, filed on Mar. 15, 2004, now Pat. No. 7,752,227.

(60) Provisional application No. 60/454,845, filed on Mar. 14, 2003.

(51) Int. Cl.
*G06F 17/30* (2006.01)
(52) U.S. Cl. ....................................... 707/758
(58) Field of Classification Search .................. 707/736, 707/737, 751, 752, 755, 756, 758
See application file for complete search history.

(56) References Cited

U.S. PATENT DOCUMENTS

| | | | |
|---|---|---|---|
| 6,073,138 A | 6/2000 | de l'Etraz et al. | |
| 6,324,541 B1 * | 11/2001 | de l'Etraz et al. | 1/1 |
| 7,167,910 B2 * | 1/2007 | Farnham et al. | 709/223 |
| 7,275,068 B2 | 9/2007 | Huberman et al. | |
| 7,325,012 B2 | 1/2008 | Nagy | |
| 2002/0124188 A1 | 9/2002 | Sherman et al. | |
| 2003/0078976 A1 | 4/2003 | Gordon | |
| 2004/0158611 A1 * | 8/2004 | Daniell et al. | 709/206 |
| 2004/0193572 A1 * | 9/2004 | Leary | 707/1 |
| 2004/0215793 A1 * | 10/2004 | Ryan et al. | 709/229 |
| 2005/0091076 A1 | 4/2005 | McGovern | |

FOREIGN PATENT DOCUMENTS

WO    WO 01/077793    4/2001

OTHER PUBLICATIONS

Henry Kautz, et al., "The Hidden Web," *American Association for Artificial Intelligence*, Summer 1997, pp. 27-36.

* cited by examiner

*Primary Examiner* — Angela Lie
(74) *Attorney, Agent, or Firm* — Chadbourne and Parke LLP; John A. Squires

(57) ABSTRACT

A method and system for managing risk by indicating links between one or more persons or entities which can include a process that gathers information about individuals and organizations into a computerized system where it can be analyzed to associate one or more individuals or organizations with links to other individuals or organizations. A user can designate a person or entity and the system will provide an indication of linkages associated with the designated person. Some embodiments can include a user specifying a particular type of link or limit links to a specified degree of separation between the designated person and any other person or entity.

18 Claims, 8 Drawing Sheets

| PERSON 702 | POSITION HELD 704 | ENTITIES ASSOCIATED WITH 706 | ASSOCIATION TYPE 708 |
|---|---|---|---|
| NAME 1 | BOARD OF DIRECTORS | ENTITY NAME 1 | FAMILY RELATION |
| NAME 2 | OFFICER | TAX ID NUMBER | BUSINESS PARTNER |
| SSN | CFO | ENTITY NAME 2 | DISPARATE BOARD |
| IDENTIFICATION NUMBER | CONSULTANT | AFFILIATE NAME | BOARD |
| AKA | EMPLOYEE | AGENCY | EMPLOYMENT |

700

LINK ANALYSIS MAPPING PROGRAM RISK MANAGEMENT

CROSS-REFERENCE TO RELATED APPLICATIONS

This is a Continuation of prior U.S. patent application Ser. No. 10/801,438, filed Mar. 15, 2004, entitled, "Link Analysis Mapping Program Risk Management," to which priority under 25 U.S.C. §120 is claimed, and which claims the benefit under 35 U.S.C. §119 of provisional application entitled "Link Analysis Mapping Program Risk Management," filed Mar. 14, 2003, bearing the Ser. No. 60/454,845. The entire contents of the aforementioned applications are herein expressly incorporated by reference.

BACKGROUND

This invention relates generally to methods and systems for analysis of relationships between people and/or entities. In particular, the present invention relates to methods and systems of determining and illustrating links that can associate a person or entity with another person or entity.

The capital markets in a country such as the United States may be the most sophisticated and regulated in the world. Nonetheless, the current trading system has resulted in examples of abuse and financial scandal through such practices as insider trading and possible conflicts of interest among board members.

Weaknesses in the current system have resulted in significant fiduciary questions relating to relationships between corporate insiders and investors, as well as apparent quid pro quo relationships among members on various boards of directors. The implications of such questions have been played out in criminal prosecutions, class action litigations, the opinions of commentators and increased regulation. One result has been increased attention to regulatory requirements relating to the ability to show the independence of board members.

This present situation also has international implications. The current system can be viewed as an invitation to continued corruption. Over the last decade, U.S. exchanges, investment banks and the U.S. government have preached the benefits of the free market. The best hope for economies is to allow companies to act in an open and transparent market that sets prices on a competitive basis, free of corruption. The current system has proven to be an anathema to this philosophy.

What is needed is a way to mitigate risks associated with relationships to corporate insiders and investors as well as interrelated board memberships. Risk management tools should serve to restore investor confidence in investment banking, capital markets and wealth management relationships.

SUMMARY

Accordingly, the present invention provides methods and systems for managing risk by indicating links between one or more persons or entities. A unique linking process is provided that gathers information about individuals and organizations into a computerized system where it can be analyzed to associate one or more individuals or organizations with links to other individuals or organizations. A user can designate a person or entity and the system will provide an indication of linkages associated with the designated person. Some embodiments can include a user specifying a particular type of link or limit links to a specified degree of separation between the designated person and any other person or entity.

The present invention allows a user to better assess one or more parties related to corporate insiders, as well as the independence of corporate officers and directors, by mapping relationships among and between companies and common members on boards of directors. Historical mapping of interlocking relationships can be made available for some predetermined number of years. Insider family relationships could also be mapped. The present invention can be useful as a dual regulatory and advisory tool, helping firms and public companies to comply with regulatory requirements by providing them with the ability to show the independence of board members, as well as assist in banking advisory work, merger advisory roles, private wealth management and client solicitation. It can also facilitate compliance with voluntary initiatives regarding LAMP allocations.

Embodiments of the present Link Analysis Mapping Program (LAMP) Risk Management methods and systems can include a computerized system, executable software, or a data signal implementing the inventive methods of the present invention. The computer server can be accessed via a network access device, such as a computer. Similarly, the data signal can be operative with a computing device, and computer code can be embodied on a computer readable medium.

Various features and embodiments are further described in the following figures, drawings and claims.

DETAILED DESCRIPTION

The present invention provides methods and systems for managing risk by indicating links between one or more persons or entities. The present invention allows a user to better assess one or more parties related to corporate insiders, as well as the independence of corporate officers and directors, by mapping relationships among and between companies and common members on boards of directors. Historical mapping of interlocking relationships can be made available for some predetermined number of years. Insider family relationships could also be mapped. The present invention can be useful as a dual regulatory and advisory tool, helping firms and public companies to comply with regulatory requirements by providing them with the ability to show the independence of board members, as well as assist in banking advisory work, merger advisory roles, private wealth management and client solicitation. It can also facilitate compliance with voluntary initiatives regarding LAMP allocations.

Overview

A unique linking process is provided that gathers information about individuals and organizations into a computerized system where it can be analyzed to associate one or more individuals or organizations with links to other individuals or organizations. A user can designate a person or entity and the system will provide an indication of linkages associated with the designated person. Some embodiments can include a user specifying a particular type of link or limit links to a specified degree of separation between the designated person and any other person or entity.

Figure 1A:
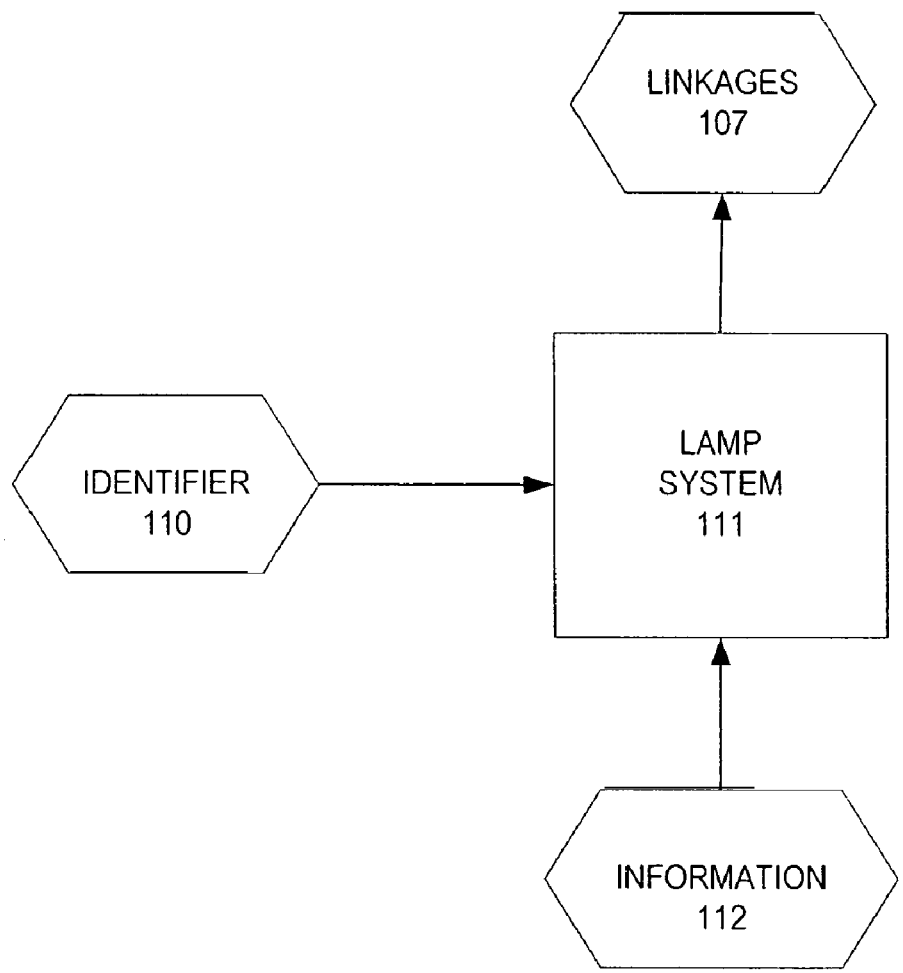
FIG. 1A illustrates a block diagram of some embodiments of the present invention.
Figure 1B:
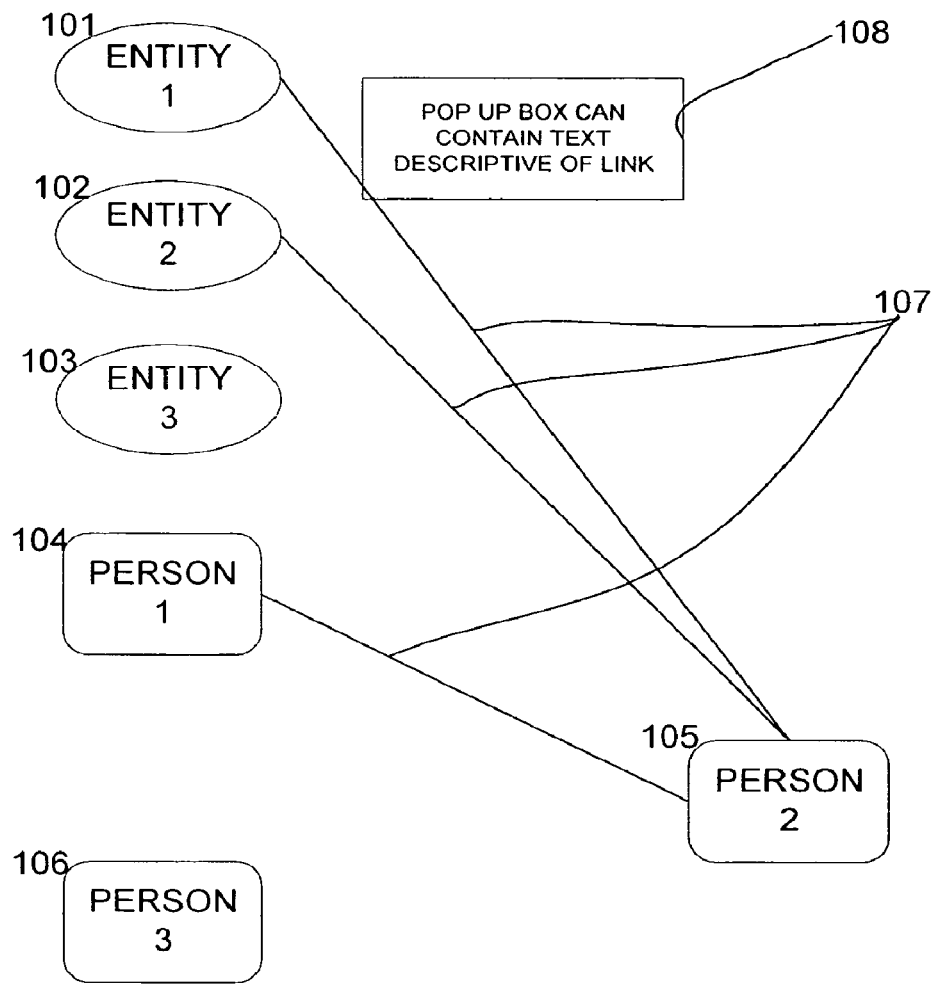
FIG. 1B illustrates a block diagram of linkages that can be illustrated in some embodiments of the present invention

Referring now to FIGS. 1A and 1B, block diagrams of some embodiments of the present invention are illustrated. An identifier 110 is input into a LAMP system 111 and the LAMP system 111 outputs an indication of one or more linkages associated with the identifier 110.

The identifier 110 can include any indication of an individual, group, organization, corporation, entity or legal person ("Person") that is capable of identifying to the LAMP system 111 the Person to which linkages are sought. An identifier 110 can include, for example, a name, a social security number, an employee identification number, a taxpayer identification number, an alias, a name also known as, a geographic location or street address, a telephone number, a government agency, a university or other educational facility, a stock ticker symbol, a trademark, a uniform resource locator, a TCP/IP address or any information or symbol that can be utilized to identify or associate with a Person.

A LAMP system 111 can include a computerized system capable of executing a software program and storing information relating to links. The LAMP system 111 is further described in FIG. 4 and FIG. 5. The LAMP system 111 can receive information 112 and store the information 112, or otherwise make the information available for analysis. The information 112 will be analyzed and processed to determine links 107 between two or more Persons.

Linkages 107 can be an indication or illustration of a relationship between two or more Persons. The links can include, for example: individuals who are on the same board of directors; an officer and a board member of the same corporation; Persons who worked in the same corporation, government entity, charity or other organization; Persons who belong to the same fraternal organization; Persons holding positions in the same political party; Persons related by blood or marriage ties; Persons sharing business relationships wherein, in this case specifically, Persons may include corporations or other organizations or entities; or any other relationship between two or more Persons.

In some embodiments, an identifier 110 can identify a Person and ask for any relationships between the named Person and any other Persons. Embodiments can also include an identifier 110 which can identify two or more Persons, and ask for any relationships among any of the named Persons. Further embodiments can also include, for example, an identifier 110 which can identify one or more Persons and request any links with a specified number of degrees of separation. For example, a Person can be named and a request can be received for any links within three degrees of separation, five degrees of separation, eight degrees of separation or other number of degrees of separation. Of course, it can also be possible to request all links available according to all of the information gathered.

Some embodiments can also include, for example, the LAMP system 111 programmed to indicate links with one or more disconnects in the linkage 107. For example, a link 107 may be present between a Person that is a board member for a particular corporation and a Person that used to be a board member for the same corporation, even if the two Persons were not on the board at the same time. The disconnect comes from the break in time between each Person's tenure on the board. Still other embodiments can include, for example, any relationship link that can be ascertained by the LAMP system 111.

FIG. 1B illustrates how a Person 105 can be identified by dragging an icon representative of the Person 105 away from a home position in line with icons of Persons 104-106 and/or entities 101-103. As the icon for the selected person 105 is dragged, the Person 105 is identified to the LAMP system 111 as a Person for which linkages 107 should be output. Accordingly, the linkages 107 can be illustrated by lines connecting the identified Person 105 with any entities 101-102 and/or Persons 104 which have an association with the identified Person 105.

In some embodiments, a description 108 of the link 107 can also be generated. The description can be generated and illustrated for example, in a pop up text box that is activated when a linkage 107 line is clicked on. The description of the link 107 can include any factual data, or artifacts that help define the link 107.

Methods

Figure 2:
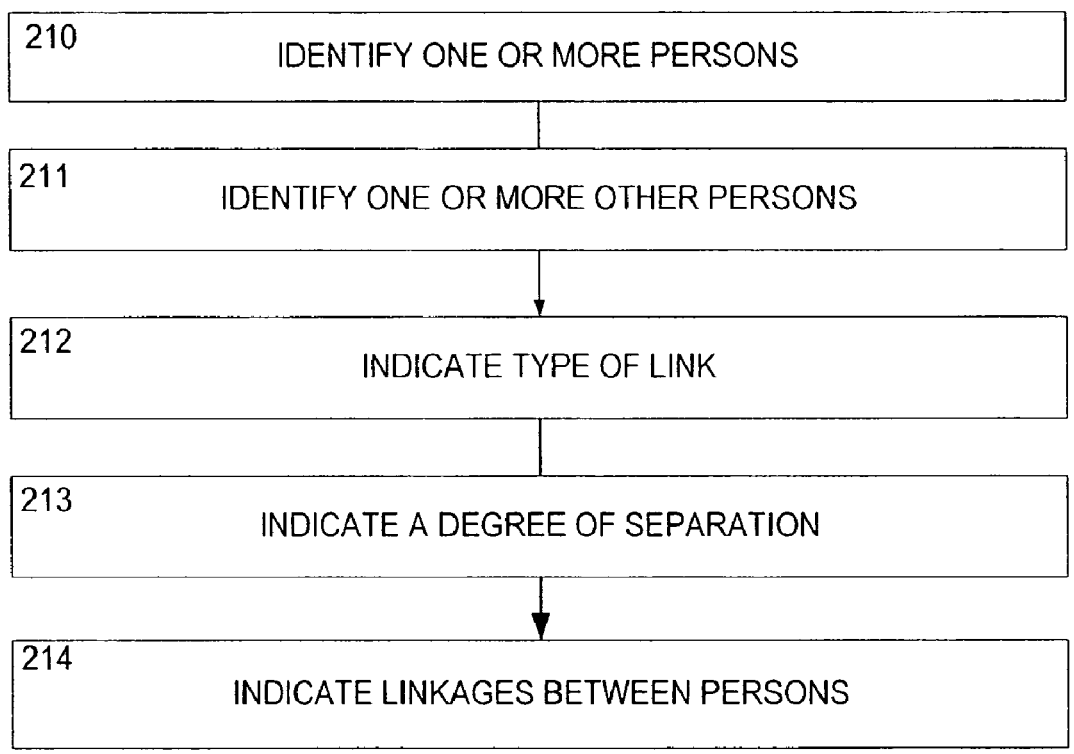
FIG. 2 illustrates a flow of exemplary steps that can be executed while implementing some embodiments of the present invention.

Referring now to FIG. 2, steps that can be performed while practicing the present invention are illustrated. The steps are presented as they may be practiced, although no particular order is required. Accordingly, any order should not limit the scope of the invention and all steps illustrated are not necessarily required to implement the invention.

At 210 one or more Persons 105-106 can be identified 110. Identification 110 can be accomplished, for example via input into a data processing terminal. Other means of identification can include, for example, facial recognition or other biometric input or any means of identifying an individual or organization to the LAMP system 111. For example, a LAMP system 111 can be linked to a personal digital assistant (PDA) or other data processing device or image capturing device. An image can be transmitted back to a LAMP system 111 and the LAMP system 111 can analyze the image with biometric or facial recognition processes to further identify a Person captured in the image.

At 211, in some embodiments, One or more additional Persons 103-104 can also be identified to the LAMP system 111. In such embodiments the LAMP system 111 can analyze gathered information 112 to determine if any links 107 between the two or more Persons 103-106 (Persons can also include entities 101-103) can be generated. At 212 a type of link 107 can be indicated. Types of links 107 can include, for example, a description of a shared membership, similar positions held, similar accomplishments, or other links 107. In some embodiments, a user can specify a particular type of link 107 that it is inquiring about, such as for example, a directorship on the same board of directors or any insider relationship. A relationship, such as an insider relation, can be defined, for example, by an internal compliance department, or by an external source, such as a statute or case law.

At 213, some embodiments can include an indication of a degree of separation between two or more Persons 103-106 included in the generated links 107. At 214, an indication of one or more links 107 can be generated. The links 107 can be indicated, for example, through a graphical user interface (GUI) displayed on a user access device, or through a hard copy printout, descriptive text, voice message, or other indicator capable of communicating information to a human or machine. In some embodiments a LAMP system 111 can also output one or more links 107 that can be associated with an individual captured in an image, such as a digital image.

Figure 3:
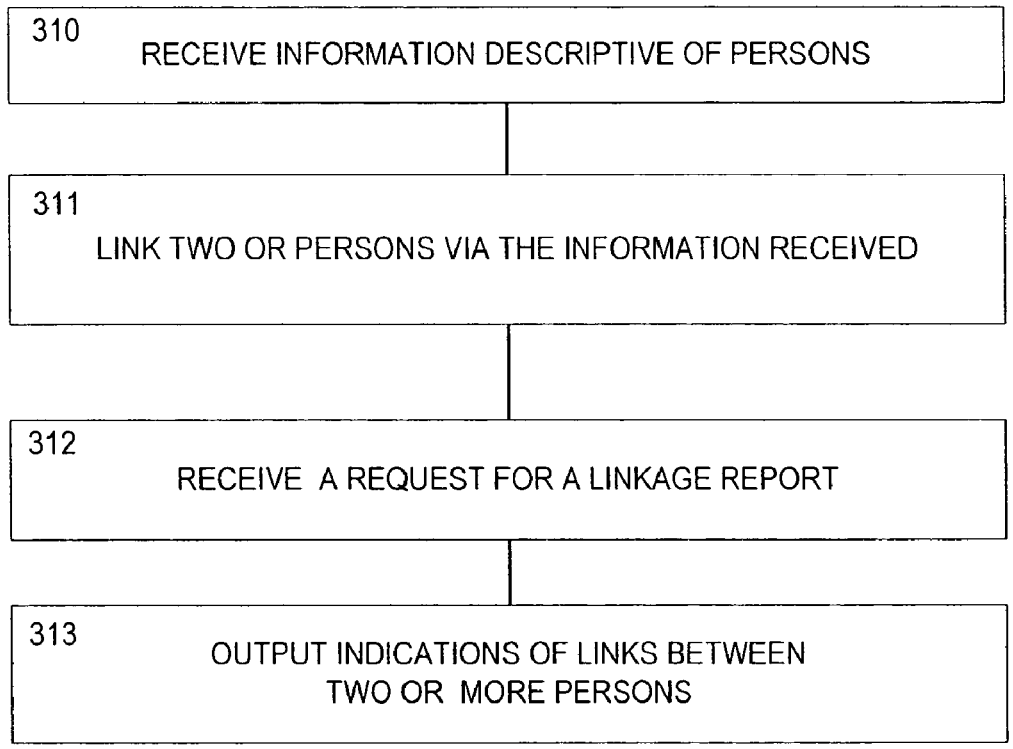
FIG. 3 illustrates a flow of exemplary steps from the perspective of a LAMP provider that can be executed while implementing some embodiments of the present invention.

Referring now to FIG. 3, steps that can be performed, from the perspective of a LAMP risk management provider are illustrated. At 310, a LAMP system 111 can receive information descriptive of Persons 103-106 and at 311 the LAMP system 111 can link two or more Persons 103-106 via the received information. At 312, the LAMP system 111 can receive a request for a linkage report or other indicator of a link between two or more Persons 103-106. At 313 the LAMP system 111 can output an indication of one or more links between two or more Persons 103-106.

Systems

Figure 4:
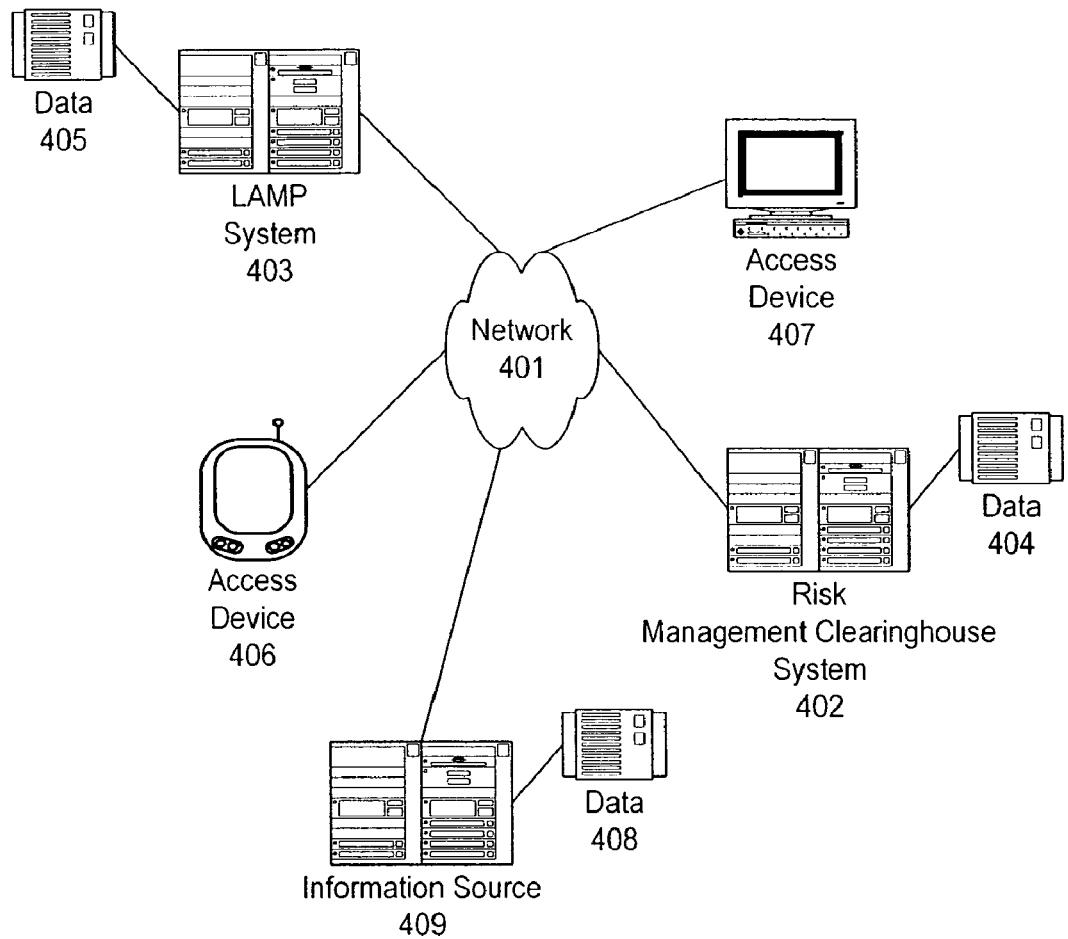
FIG. 4 illustrates a network of computer systems that can exemplify some embodiments of the present invention.

Referring now to FIG. 4, a network diagram illustrating one embodiment of the present invention is shown 400. An automated LAMP system 403 can include a computerized server accessible via a distributed network 401 such as the Internet, or a private network. In addition, an automated risk management clearinghouse (RMC) system 402 can also include a computerized server accessible via the distributed network 401. The RMC system 402 can gather information relating to one or more Persons 103-106, and supply the information to the LAMP system 403 via the network 401. In addition, other information sources 409 can also supply a LAMP system 403 with information. Embodiments can include one or more data storage devices 404-405, 408 connected to various computerized devices 402-403, 409 to store information and make it available to the respective devices 402-403, 409. A user can use one or more computerized system or network access devices 406-407 to receive, input, transmit or view information processed in the LAMP system 403, RMC system 402, a peer device, and/or one or more other network access devices 406-407. A protocol, such as, for example, the transmission control protocol internet protocol (TCP/IP) can be utilized to provide consistency and reliability.

One or more system access devices 406-407 can communicate with the LAMP system 403 or RMC system 402 to access data and programs stored at the respective servers. The one or more system access devices 406-407 may interact with the LAMP system 403 or RMC system 402 as if the servers were a single entity within the network 400. Additionally, the LAMP system 403 and RMC system 402 may include multiple processing and database sub-systems, such as cooperative or redundant processing and/or database servers that can be geographically dispersed throughout the network 400.

Figure 5:
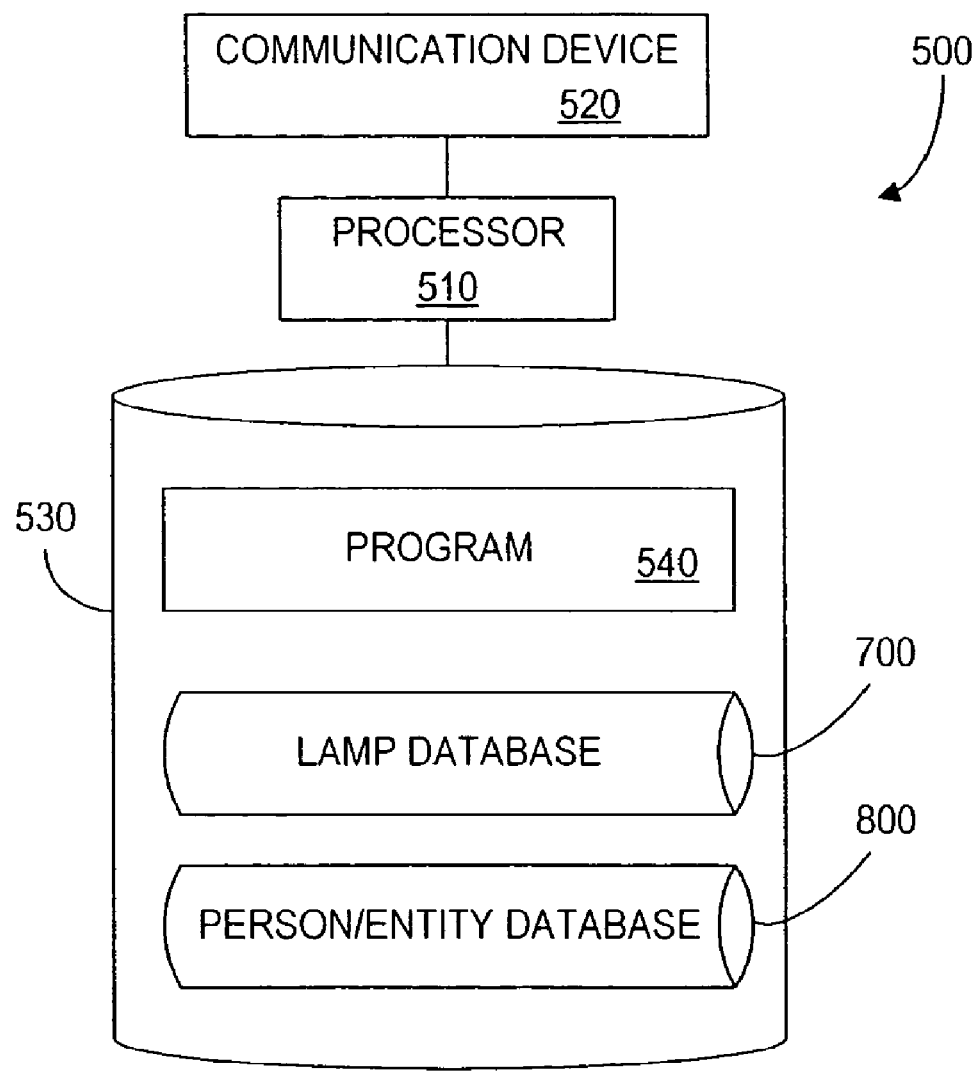
FIG. 5 illustrates a computerized device that can be utilized to implement some embodiments of the present invention.

A server utilized in a RMC system 402 and LAMP system 403 can include a processor, memory and a user input device, such as a keyboard and/or mouse, and a user output device, such as a display screen and/or printer, as further detailed in FIG. 5. The server can also include one or more databases 404-405, 408 storing data relating to Persons 103-106 and links 107. Gathering data into an aggregate data structure 404-405, 408, such as a data warehouse, allows a server to have the data readily available for processing a risk management search associated with a company's earnings. Aggregated data 404-405, 408 can also be scrubbed or otherwise enhanced to aid in searching (as further explained below).

Typically, one or more access devices 406-407 will access a LAMP system 403 using client software executed at the one or more system access devices 406-407. The client software may include a generic hypertext markup language (HTML) browser, such as Netscape Navigator or Microsoft Internet Explorer (i.e., a "WEB browser"). The client software may also be a proprietary browser, and/or other host access software. In some cases, an executable program, such as a Java™ program, may be downloaded from a server to the one or more system access devices 406-407 and executed at the one or more system access devices 406-407 as part of a LAMP allocation system. Other implementations include proprietary software installed from a computer readable medium, such as a CD ROM. The invention may therefore be implemented in digital electronic circuitry, computer hardware, firmware, software, or in combinations of the above. Apparatus of the invention may therefore be implemented in a computer program product tangibly embodied in a machine-readable storage device for execution by a programmable processor; and method steps of the invention may be performed by a programmable processor executing a program of instructions to perform functions of the invention by operating on input data and generating output.

In some embodiments, data contained in a database can be scrubbed or otherwise enhanced. Data scrubbing can be utilized to store information in a manner that gives efficient access to pertinent data and facilitate expedient access to data.

FIG. 5 illustrates a controller 500 that is descriptive of the one or more access devices 406-407 shown, for example, in FIG. 4 according to some embodiments of the present invention. The LAMP controller 500 comprises a processor 510, such as one or more processors, coupled to a communication device 520 configured to communicate via a communication network (not shown in FIG. 5). The communication device 520 may be used to communicate, for example, with one or more network access devices 406-407.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 can store a program 540 for controlling the processor 510. The processor 510 performs instructions of the program 540, and thereby operates in accordance with the present invention. For example, the processor 510 may receive information descriptive of a LAMP, including auction and pre-auction details, and allocate shares according to rules defined by the details. The processor 510 may also transmit information comprising share allocation, pricing, or other information.

The storage device 530 can store LAMP related data in a first database 700 and risk management data in a RMC database 800, and other data as needed. The illustration and accompanying description of the LAMP related database presented herein is exemplary, and any number of other database arrangements can be employed besides those suggested by the figures.

Figure 6:
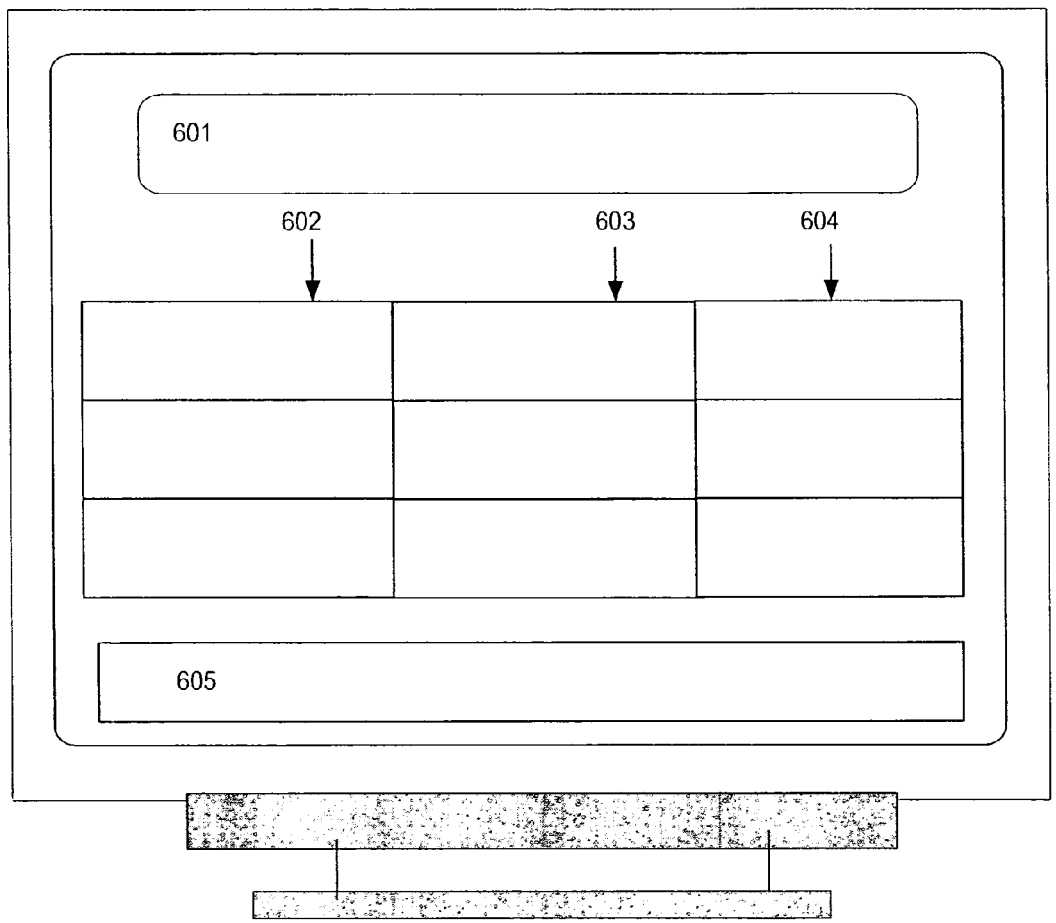
FIG. 6 illustrates an exemplary graphical user interface that can implement various aspects of the present invention.

Referring now to FIG. 6, an exemplary GUI 600 that can be utilized while practicing the present invention is illustrated. The GUI can be presented on one or more network access devices 406-407 or any other type of terminal or interactive station capable of creating a display pursuant to an electronic signal. A portion of display 601 can display information descriptive of a LAMP system 111, such as for example, types of Persons 103-106 that can be analyzed, date ranges, or other variables. Another portion of the display 602 can include information descriptive of types of links 107. Still another portion 603 can contain information descriptive of degrees of separation that can be delineated in the LAMP system 111. Portions of the display 600 can also be interactive, and allow a user to input data, such as data descriptive of a Person 605 that includes an identifier 110.

Figure 7:
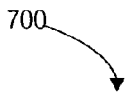
FIG. 7 illustrates an exemplary data structure that can be utilized to implement certain aspects of the present invention.

Referring now to FIG. 7, a design of a portion of a database that can be utilized while implementing the present invention is illustrated. The database 700 can include, for example, a field for receiving and interactively storing data descriptive of a Person 702, as well as a field containing data descriptive of a position held 704 and/or entities associated with a Person 706. Another field can hold data descriptive of an association type 708. Obviously, other data fields storing data utilized in various facets of the present invention can also be included. The data can be arranged and accessed using any known data storage and accessing techniques.

A number of embodiments of the present invention have been described. Nevertheless, it will be understood that various modifications may be made without departing from the spirit and scope of the invention.

What is claimed is:

1. A processor-implemented method comprising:
    receiving a relationship linkage analysis request from a user identifying a person, and requesting relationship links associated with the identified person with a specified number of degrees of separation and with a specified date range;
    retrieving information descriptive of relationship links associating two or more persons, wherein the relationship links indicate an association type between the two or more persons;
    processing via a processor the retrieved information to determine qualifying relationship links for inclusion in relationship linkage analysis based on an association type;
    performing via the processor the relationship linkage analysis associating the identified person with one or more other persons with the specified number of degrees of separation and with the specified date range based on the processed qualifying relationship links;
    generating via the processor a relationship linkage analysis report based on the relationship linkage analysis; and
    sending the relationship linkage analysis report to the user.

2. The method of claim 1, wherein the relationship linkage analysis request further comprises a specified association type and the relationship linkage analysis associates the identified person with one or more other persons also having the specified association type.

3. The method of claim 1, wherein a person is an individual, a group, an organization, a corporation or an entity.

4. The method of claim 1, wherein the relationship linkage analysis report comprises a relationship map that graphically displays relationship links between the identified person and the associated one or more other persons.

5. The method of claim 4, further comprising generating descriptions for the relationship links.

6. The method of claim 5, further comprising displaying the generated description of a relationship link selected by the user in a pop up text box.

7. An apparatus, comprising:
    a memory;
    a processor disposed in communication with said memory, and configured to issue a plurality of processing instructions stored in the memory, wherein the processor issues instructions to:
        receive a relationship linkage analysis request from a user identifying a person, and requesting relationship links associated with the identified person with a specified number of degrees of separation and with a specified date range;
        retrieve information descriptive of relationship links associating two or more persons, wherein the relationship links indicate an association type between the two or more persons;
        process via a processor the retrieved information to determine qualifying relationship links for inclusion in relationship linkage analysis based on an association type;
        perform via the processor the relationship linkage analysis associating the identified person with one or more other persons with the specified number of degrees of separation and with the specified date range based on the processed qualifying relationship links;
        generate via the processor a relationship linkage analysis report based on the relationship linkage analysis; and
        send the relationship linkage analysis report to the user.

8. The apparatus of claim 7, wherein the relationship linkage analysis request further comprises a specified association type and the relationship linkage analysis associates the identified person with one or more other persons also having the specified association type.

9. The apparatus of claim 7, wherein a person is an individual, a group, an organization, a corporation or an entity.

10. The apparatus of claim 7, wherein the relationship linkage analysis report comprises a relationship map that graphically displays relationship links between the identified person and the associated one or more other persons.

11. The apparatus of claim 10, further comprising instructions to generate descriptions for the relationship links.

12. The apparatus of claim 11, further comprising instructions to display the generated description of a relationship link selected by the user in a pop up text box.

13. A processor-readable physical medium storing processor-issuable and -generated instructions to:
    receive a relationship linkage analysis request from a user identifying a person, and requesting relationship links associated with the identified person with a specified number of degrees of separation and with a specified date range;
    retrieve information descriptive of relationship links associating two or more persons, wherein the relationship links indicate an association type between the two or more persons;
    process via a processor the retrieved information to determine qualifying relationship links for inclusion in relationship linkage analysis based on an association type;
    perform via the processor the relationship linkage analysis associating the identified person with one or more other persons with the specified number of degrees of separation and with the specified date range based on the processed qualifying relationship links;
    generate via the processor a relationship linkage analysis report based on the relationship linkage analysis; and
    send the relationship linkage analysis report to the user.

14. The medium of claim 13, wherein the relationship linkage analysis request further comprises a specified association type and the relationship linkage analysis associates the identified person with one or more other persons also having the specified association type.

15. The medium of claim 13, wherein a person is an individual, a group, an organization, a corporation or an entity.

16. The medium of claim 13, wherein the relationship linkage analysis report comprises a relationship map that graphically displays relationship links between the identified person and the associated one or more other persons.

17. The medium of claim 16, further comprising instructions to generate descriptions for the relationship links.

18. The medium of claim 17, further comprising instructions to display the generated description of a relationship link selected by the user in a pop up text box.

\* \* \* \* \*